(12) United States Patent
Miyazawa

(10) Patent No.: US 9,851,582 B2
(45) Date of Patent: Dec. 26, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 14/827,781

(22) Filed: Aug. 17, 2015

(65) Prior Publication Data

US 2016/0054579 A1    Feb. 25, 2016

(30) Foreign Application Priority Data

Aug. 21, 2014    (JP) ................. 2014-168329

(51) Int. Cl.
*G02B 27/64* (2006.01)
*G02B 15/14* (2006.01)
*G02B 15/173* (2006.01)

(52) U.S. Cl.
CPC ........... *G02B 27/646* (2013.01); *G02B 15/14* (2013.01); *G02B 15/173* (2013.01)

(58) Field of Classification Search
CPC ........ G02B 15/00; G02B 15/14; G02B 15/15; G02B 15/16; G02B 15/167; G02B 15/173; G02B 15/20; G02B 15/22; G02B 15/24; G02B 15/28; G02B 26/64; G02B 26/646
See application file for complete search history.

(56) References Cited

U.S. PATENT DOCUMENTS

| | | | | |
|---|---|---|---|---|
| 5,739,961 | A * | 4/1998 | Nakayama | G02B 15/173 359/684 |
| 6,016,228 | A * | 1/2000 | Uzawa | G02B 15/173 359/683 |
| 6,414,800 | B1 * | 7/2002 | Hamano | G02B 15/173 359/687 |
| 7,023,624 | B2 * | 4/2006 | Nanba | G02B 15/177 359/557 |

(Continued)

FOREIGN PATENT DOCUMENTS

| | | |
|---|---|---|
| JP | H11-311742 A | 11/1999 |
| JP | 2002-031756 A | 1/2002 |
| JP | 2003-322795 A | 11/2003 |

*Primary Examiner* — Thong Nguyen
(74) *Attorney, Agent, or Firm* — Carter, Deluca, Farrell & Schmidt, LLP

(57) ABSTRACT

Provided is a zoom lens, comprising, in order from an object side to an image side, first to fourth lens units having positive, negative, positive, and positive refractive powers. During zooming, first lens unit does not move, and second to fourth lens units move. Third lens unit comprises, in order from the object side to the image side, first and second lens subunits each having a positive refractive power. Second lens subunit moves in a direction having a component of a direction perpendicular to an optical axis during image blur correction. Third lens unit comprises at least two positive lenses and at least two negative lenses. Second lens subunit comprises a positive lens and a negative lens. A focal length (f2) of second lens unit, a focal length (f3) of third lens unit, and a focal length (f3b) of second lens subunit are each appropriately set.

12 Claims, 11 Drawing Sheets

(56) References Cited

U.S. PATENT DOCUMENTS

| | | | |
|---|---|---|---|
| 7,982,970 B2* | 7/2011 | Wada | G02B 15/173 |
| | | | 348/240.99 |
| 2005/0083584 A1* | 4/2005 | Ito | G02B 27/646 |
| | | | 359/687 |
| 2014/0036138 A1* | 2/2014 | Komatsu | G02B 13/18 |
| | | | 348/345 |

* cited by examiner

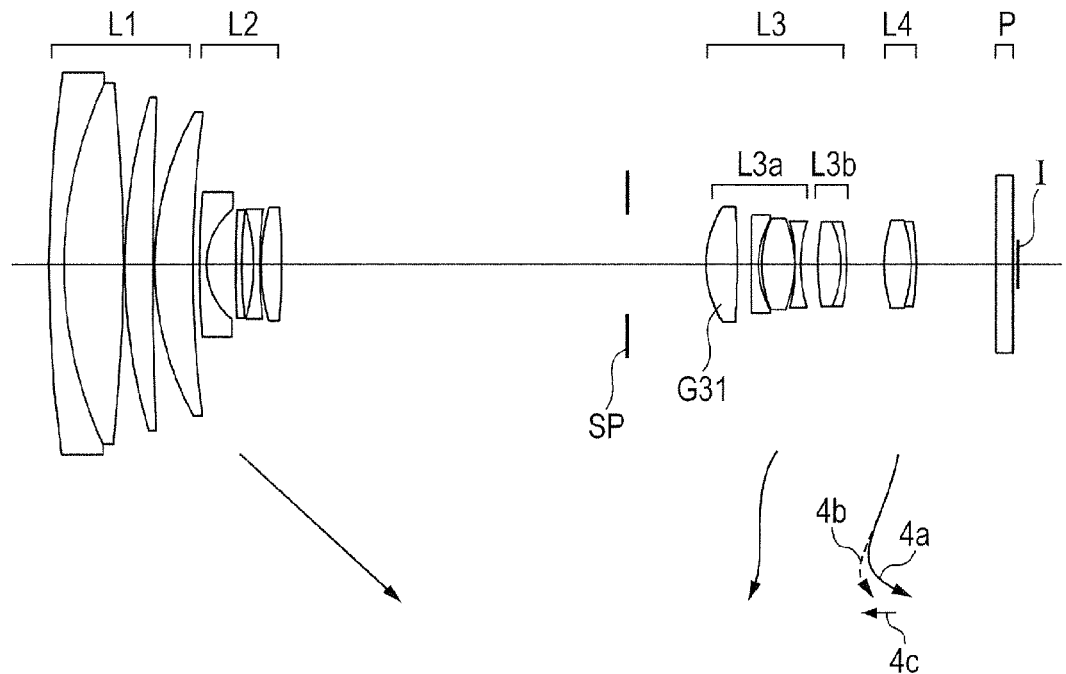
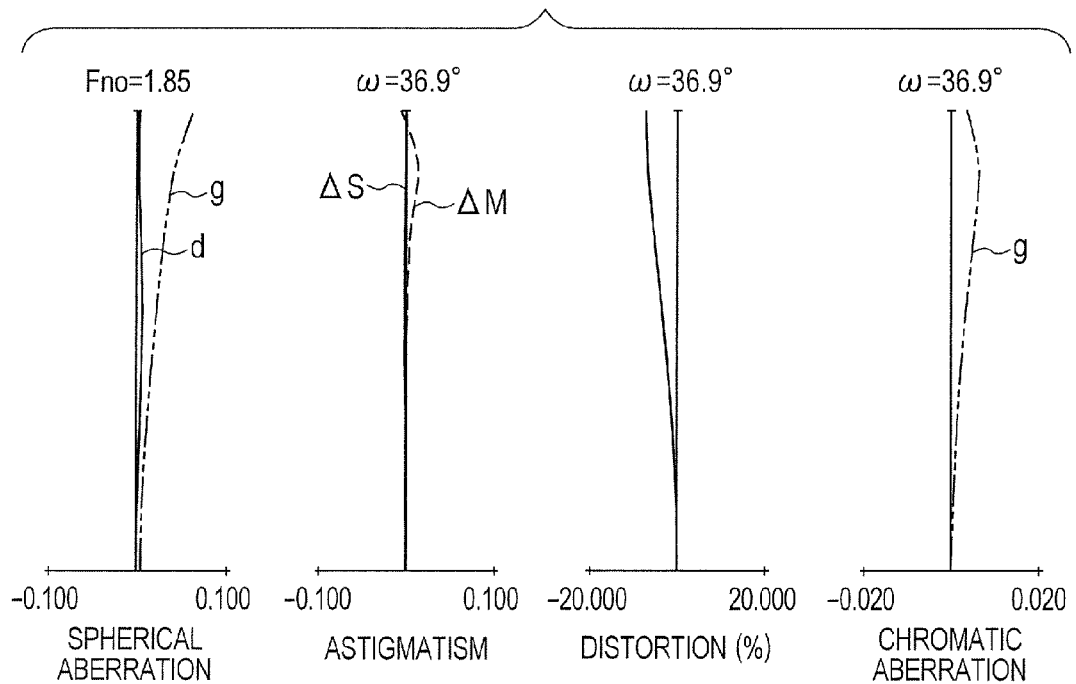

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, which are suitable for an image pickup optical system of an image pickup apparatus, such as a video camera, a silver-halide camera, a digital camera, a TV camera, or a monitoring camera.

2. Description of the Related Art

In recent years, a zoom lens used with an image pickup apparatus is required to have a high zoom ratio and a high resolution and to be compact. Further, when a vibration is applied to the zoom lens during photography of a subject, image blur occurs, and hence the zoom lens is required to have an image stabilization function for avoiding the image blur. There has hitherto been known a zoom lens having a four-unit configuration including, in order from an object side to an image side, first, second, third, and fourth lens units having positive, negative, positive, and positive refractive powers.

In Japanese Patent Application Laid-Open No. 2002-031756, there is disclosed a four-unit zoom lens in which a second lens unit and a third lens unit are moved to perform zooming, and a fourth lens unit is moved to correct an image plane movement accompanying the zooming. In Japanese Patent Application Laid-Open No. H11-311742, there is disclosed a four-unit zoom lens in which a second lens unit is moved to perform zooming, a fourth lens unit is moved to correct an image plane movement accompanying the zooming, and a third lens unit is moved in its entirety in a direction perpendicular to an optical axis to correct image blur. In Japanese Patent Application Laid-Open No. 2003-322795, there is disclosed a four-unit zoom lens in which second and fourth lens units are moved during zooming, and a lens portion forming a part of a third lens unit is moved in a direction perpendicular to the optical axis to correct image blur.

In the zoom lens having the image stabilization function, when an image stabilization lens unit has a large size and heavy weight, in order to cause the image stabilization lens unit to operate, a driving source having large driving power needs to be adopted. As a result, optical system units including the driving source are increased in size as a whole, and the zoom lens is increased in weight. Moreover, when the image stabilization lens unit is increased in weight, responsiveness of an image stabilization operation is reduced, with the result that fast control becomes difficult.

With a method in which, for image stabilization, lens units forming a part of the zoom lens are decentered in parallel in the direction perpendicular to the optical axis, the image stabilization lens unit is reduced in size and weight, and high-speed image stabilization is easy. However, large decentering aberration occurs during the image stabilization, and there is a tendency for an optical characteristic to be reduced significantly. Therefore, it is important for the zoom lens having an image stabilization mechanism to have the lens unit for image stabilization that is small in size and weight, and a small degradation in optical characteristic during the correction of the image blur (during the image stabilization).

SUMMARY OF THE INVENTION

According to one embodiment of the present invention, there is provided a zoom lens, comprising, in order from an object side to an image side:

a first lens unit having a positive refractive power;
a second lens unit having a negative refractive power;
a third lens unit having a positive refractive power; and
a fourth lens unit having a positive refractive power,
during zooming, the first lens unit being configured not to move, and the second lens unit, the third lens unit, and the fourth lens unit being configured to move,
in which the third lens unit comprises, in order from the object side to the image side, a first lens subunit and a second lens subunit each having a positive refractive power, the second lens subunit is configured to move in a direction having a component of a direction perpendicular to an optical axis during image blur correction, the third lens unit comprises at least two positive lenses and at least two negative lenses, and the second lens subunit comprises a positive lens and a negative lens, and
in which the following conditional expressions are satisfied:

$-3.9 < f3/f2 < -2.2$ $0.9 < f3b/f3 < 1.6$ where f2 represents a focal length of the second lens unit, f3 represents a focal length of the third lens unit, and f3b represents a focal length of the second lens subunit.

Further features of the present invention will become apparent from the following description of exemplary embodiments with reference to the attached drawings.

BRIEF DESCRIPTION OF THE DRAWINGS

FIG. 9 is a lens cross-sectional view at a wide angle end of a zoom lens of Example 5.

FIG. 10A is an aberration diagram of the zoom lens of Example 5 at the wide angle end.

DESCRIPTION OF THE EMBODIMENTS

A zoom lens and an image pickup apparatus including the zoom lens according to Examples of the present invention are described below with reference to the accompanying drawings. The zoom lens according to the present invention comprises a first lens unit having a positive refractive power, a second lens unit having a negative refractive power, a third lens unit having a positive refractive power, and a fourth lens unit having a positive refractive power, which are arranged in order from an object side to an image side. During zooming, the second lens unit, the third lens unit, and the fourth lens unit are moved in loci different from each other on an optical axis. The third lens unit comprises, in order from the object side to the image side, a first lens subunit having a positive refractive power, and a second lens subunit (image stabilization lens unit), which is configured to move in a direction having a component of a direction perpendicular to the optical axis during image blur correction.

Figure 1:
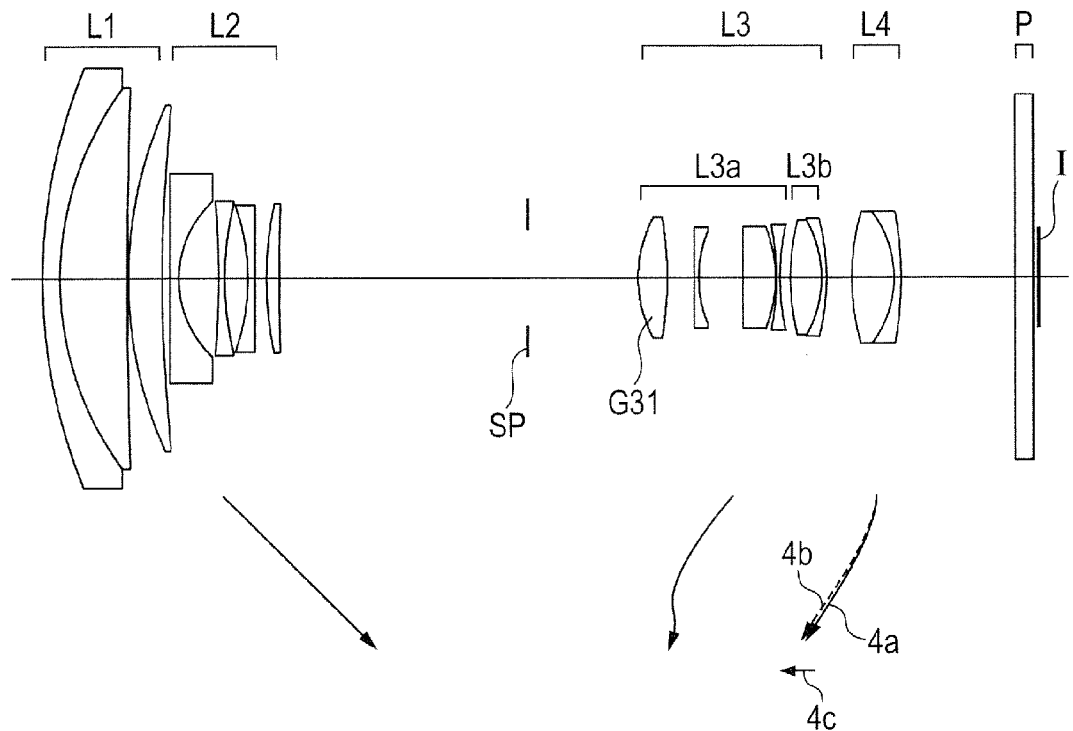
FIG. 1 is a lens cross-sectional view at a wide angle end of a zoom lens of Example 1.
Figure 2A:
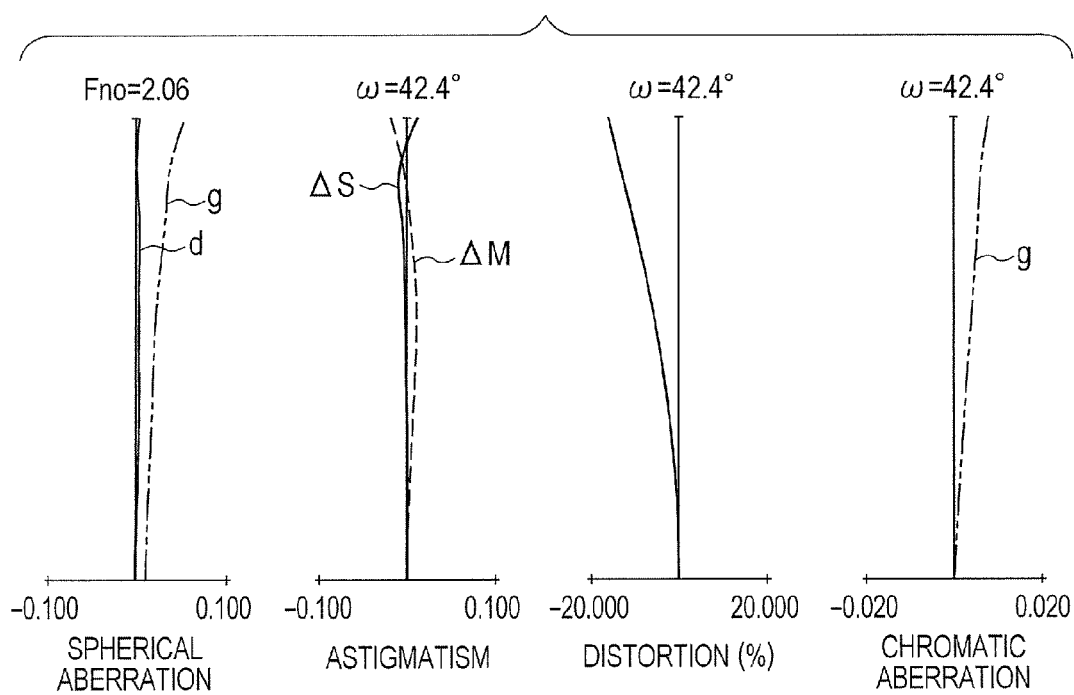
FIG. 2A is an aberration diagram of the zoom lens of Example 1 at the wide angle end.
Figure 2B:
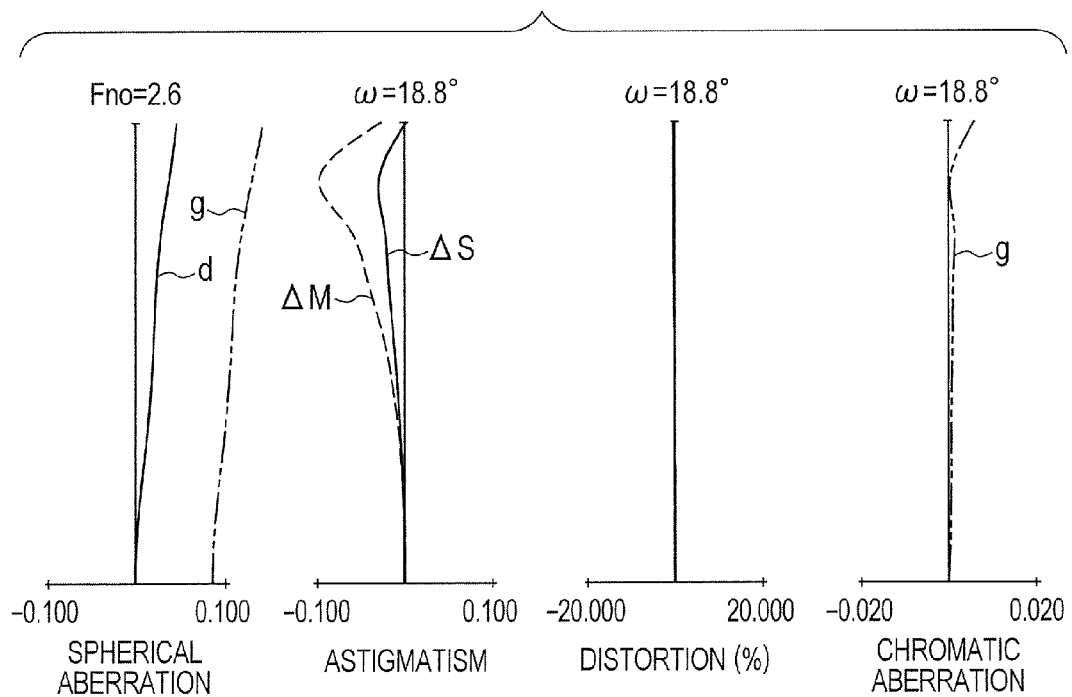
FIG. 2B is an aberration diagram of the zoom lens of Example 1 at an intermediate zoom position.
Figure 2C:
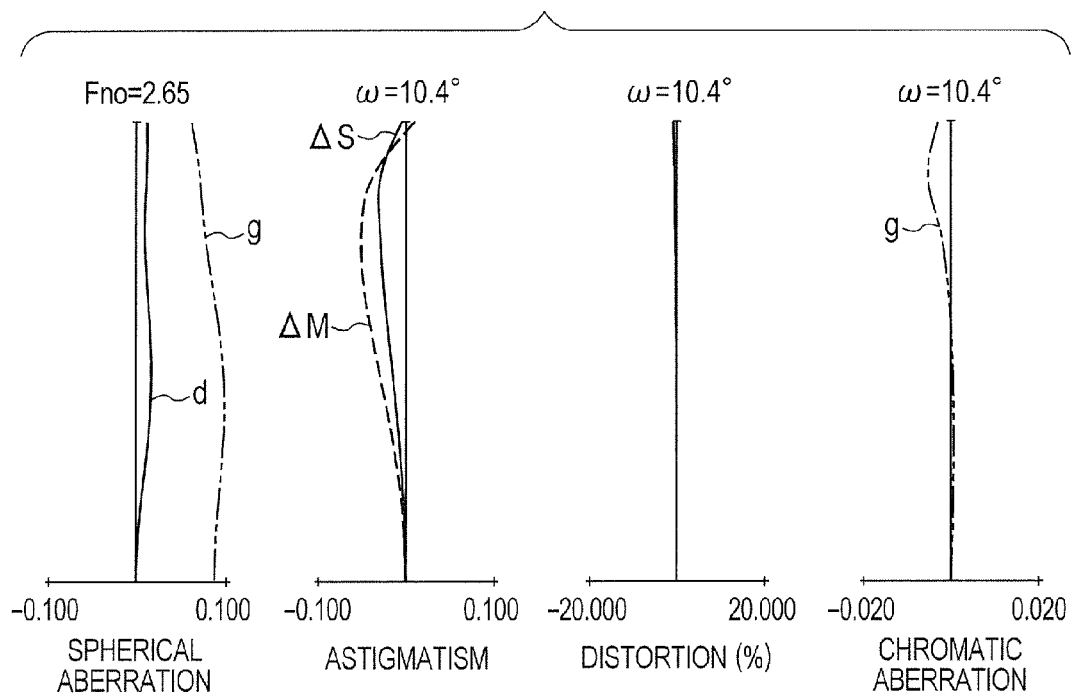
FIG. 2C is an aberration diagram of the zoom lens of Example 1 at a telephoto end.
Figure 3:
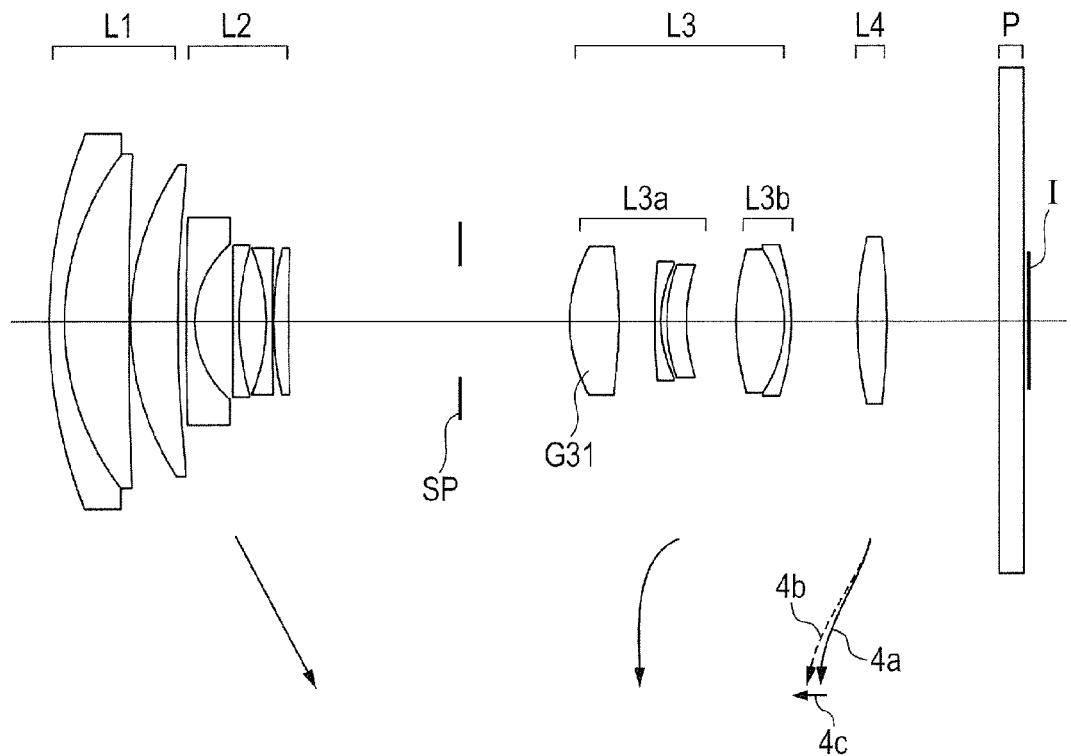
FIG. 3 is a lens cross-sectional view at a wide angle end of a zoom lens of Example 2.
Figure 4A:
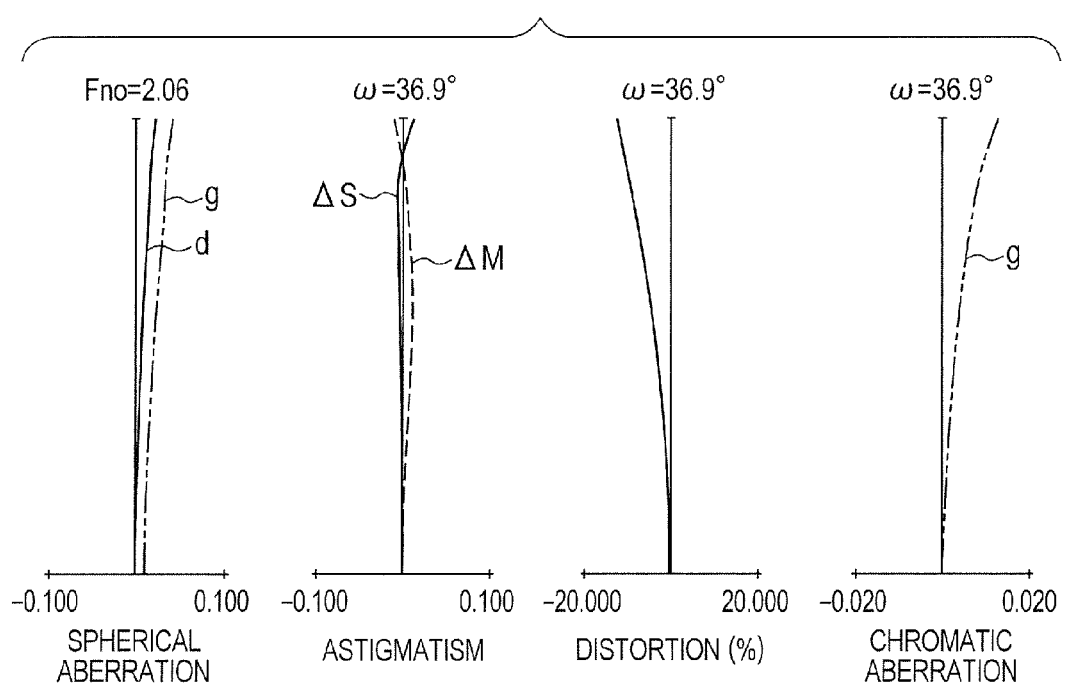
FIG. 4A is an aberration diagram of the zoom lens of Example 2 at the wide angle end.
Figure 4B:
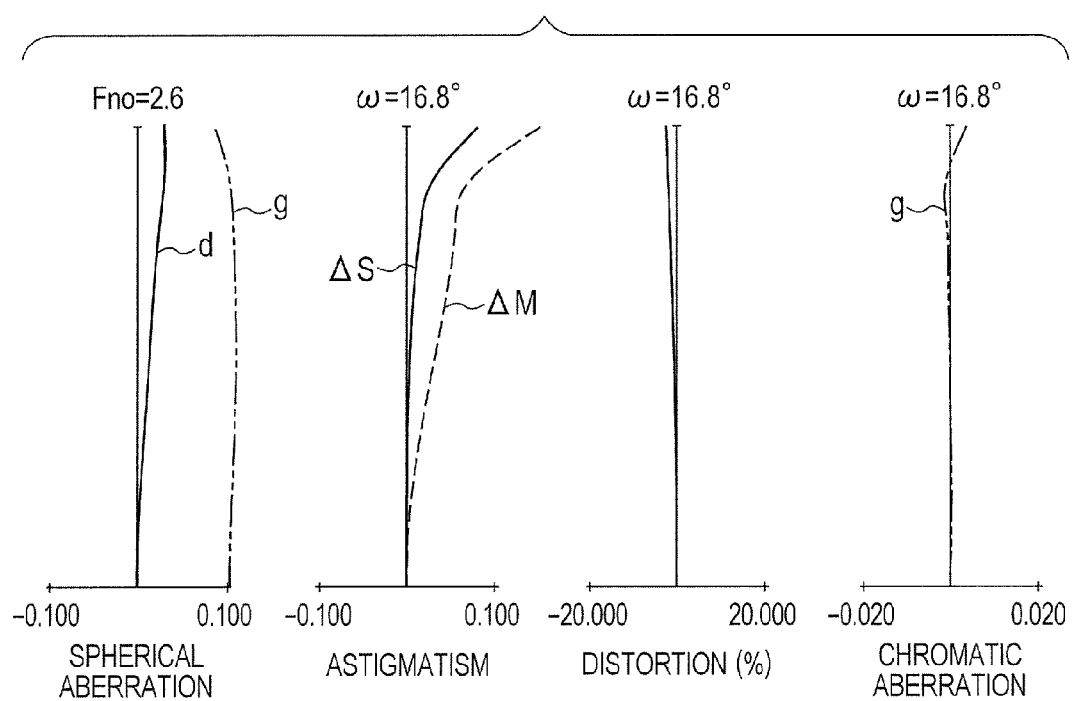
FIG. 4B is an aberration diagram of the zoom lens of Example 2 at an intermediate zoom position.
Figure 4C:
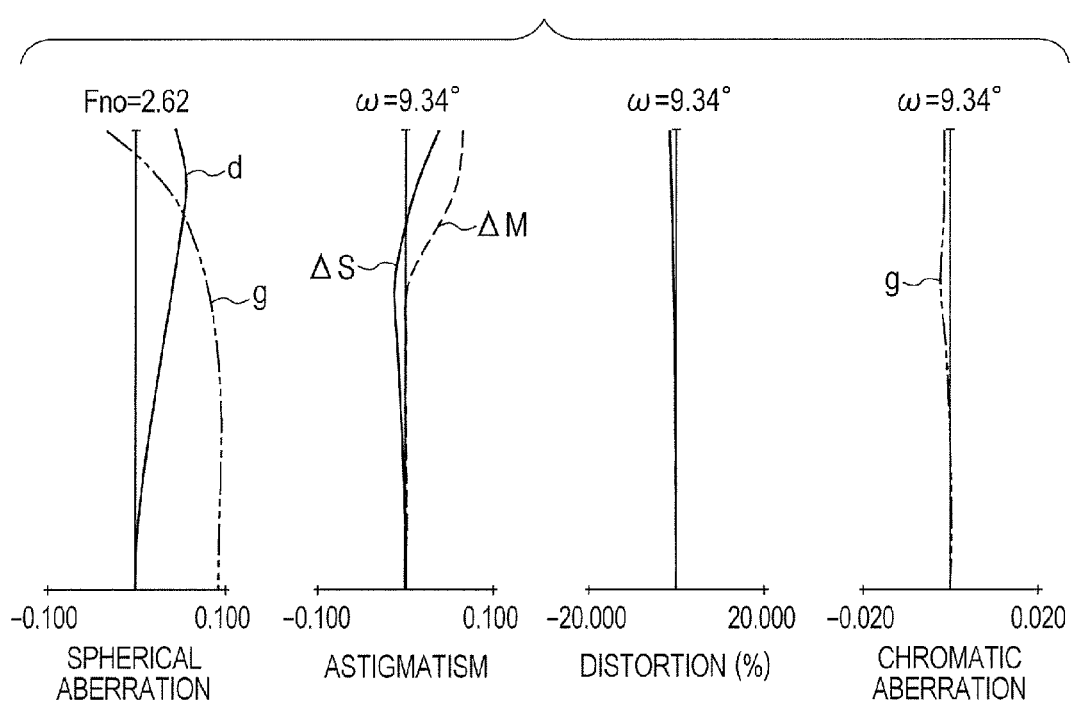
FIG. 4C is an aberration diagram of the zoom lens of Example 2 at a telephoto end.

FIG. 1 is a lens cross-sectional view at a wide angle end (short-focal length end) of a zoom lens according to Example 1. FIGS. 2A, 2B, and 2C are aberration diagrams of the zoom lens of Example 1 at the wide angle end, an intermediate zoom position, and a telephoto end (long-focal length end), respectively, when focusing to an infinite object. FIG. 3 is a lens cross-sectional view at the wide angle end of a zoom lens according to Example 2. FIGS. 4A, 4B, and 4C are aberration diagrams of the zoom lens of Example 2 at the wide angle end, the intermediate zoom position, and the telephoto end, respectively, when focusing to the infinite object.

Figure 5:
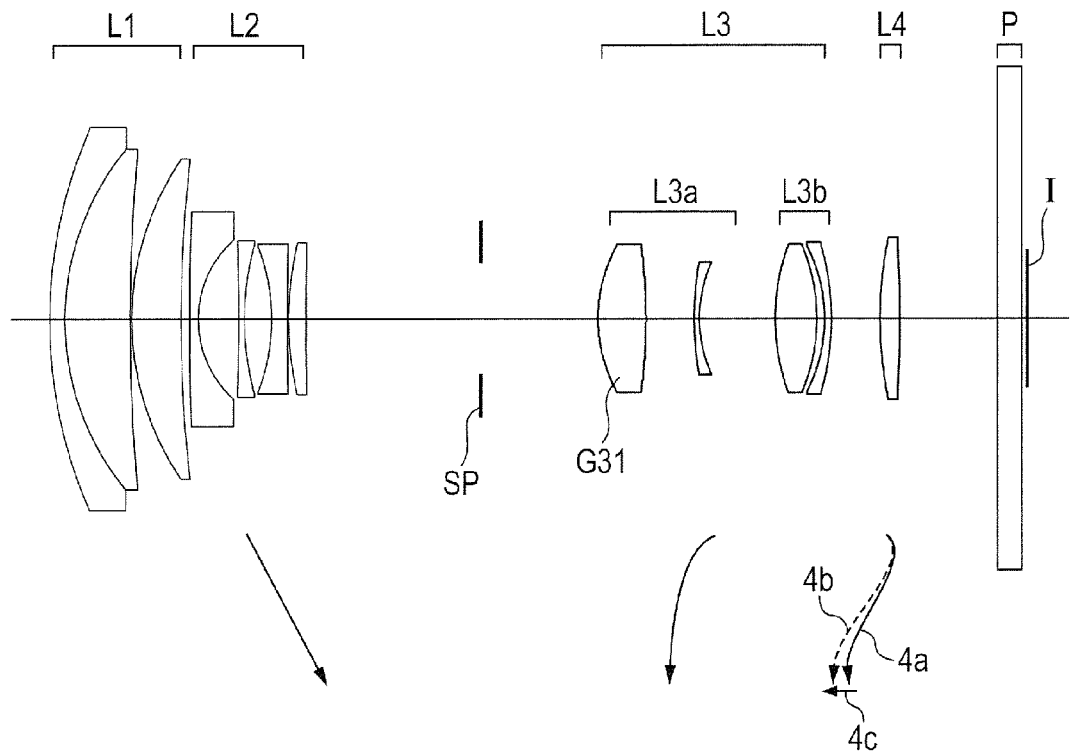
FIG. 5 is a lens cross-sectional view at a wide angle end of a zoom lens of Example 3.
Figure 6A:
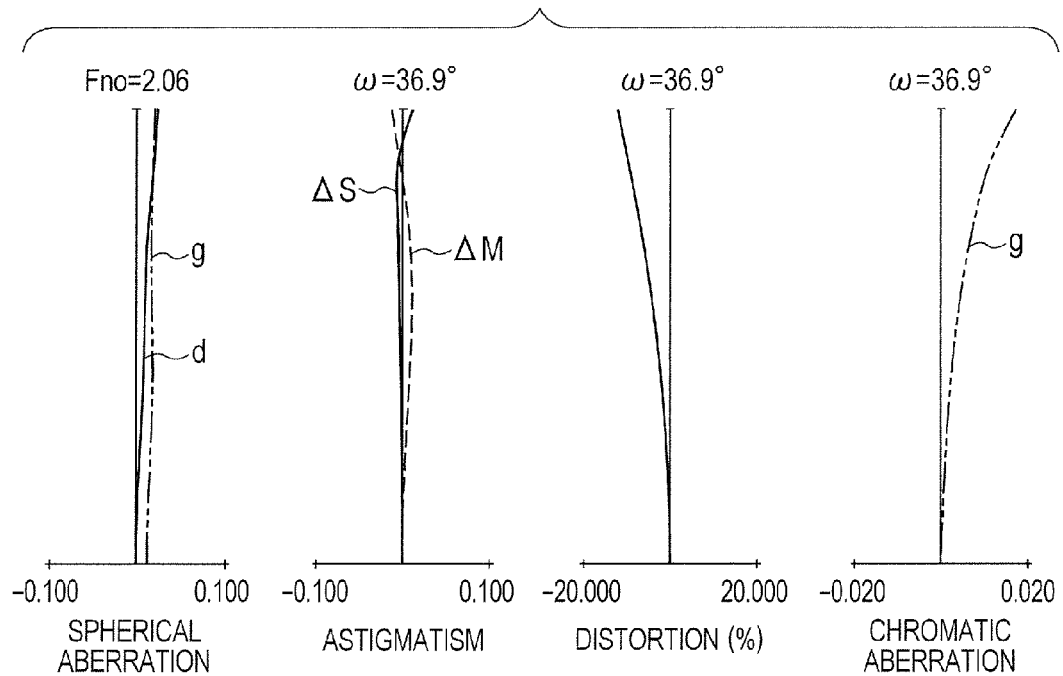
FIG. 6A is an aberration diagram of the zoom lens of Example 3 at the wide angle end.
Figure 6B:
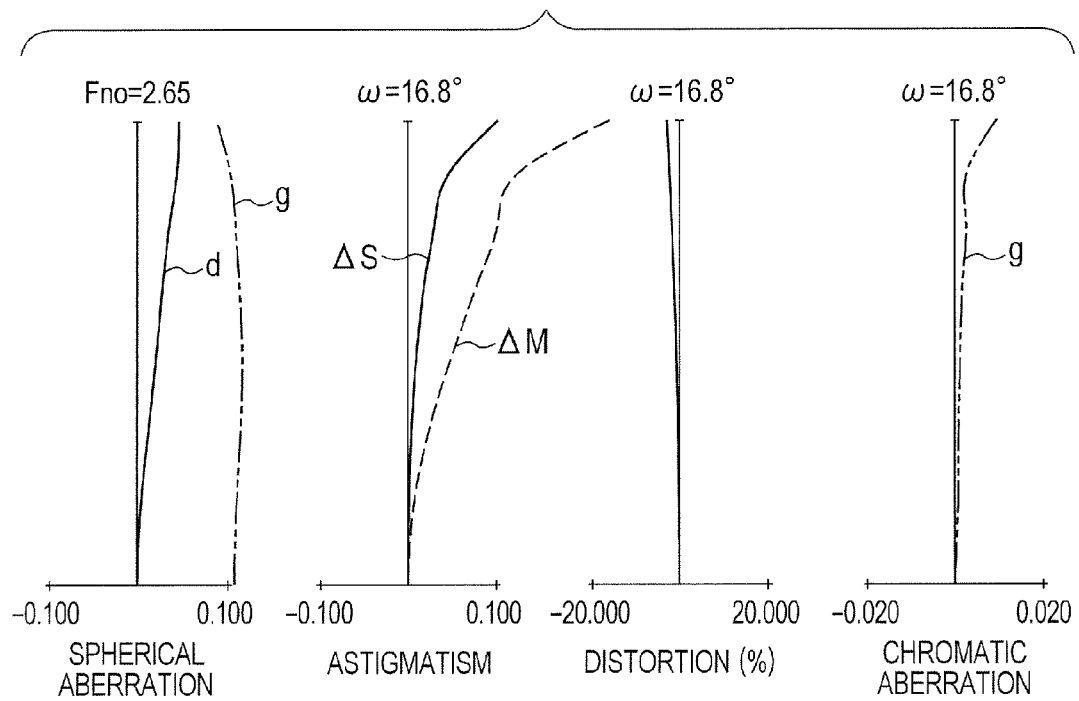
FIG. 6B is an aberration diagram of the zoom lens of Example 3 at an intermediate zoom position.
Figure 6C:
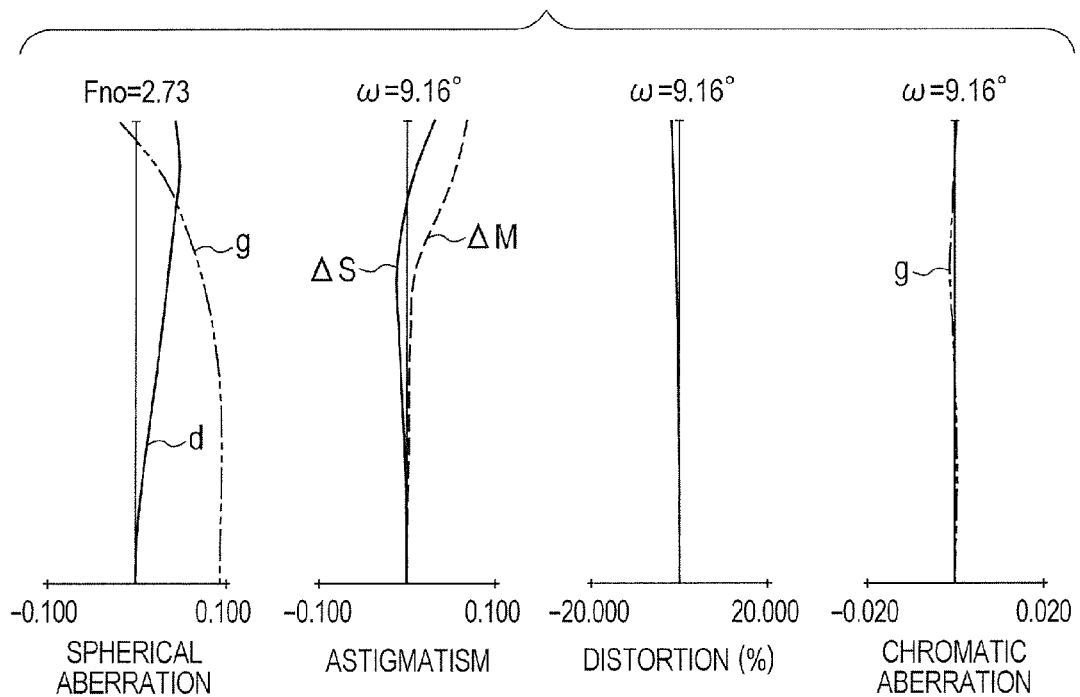
FIG. 6C is an aberration diagram of the zoom lens of Example 3 at a telephoto end.
Figure 7:
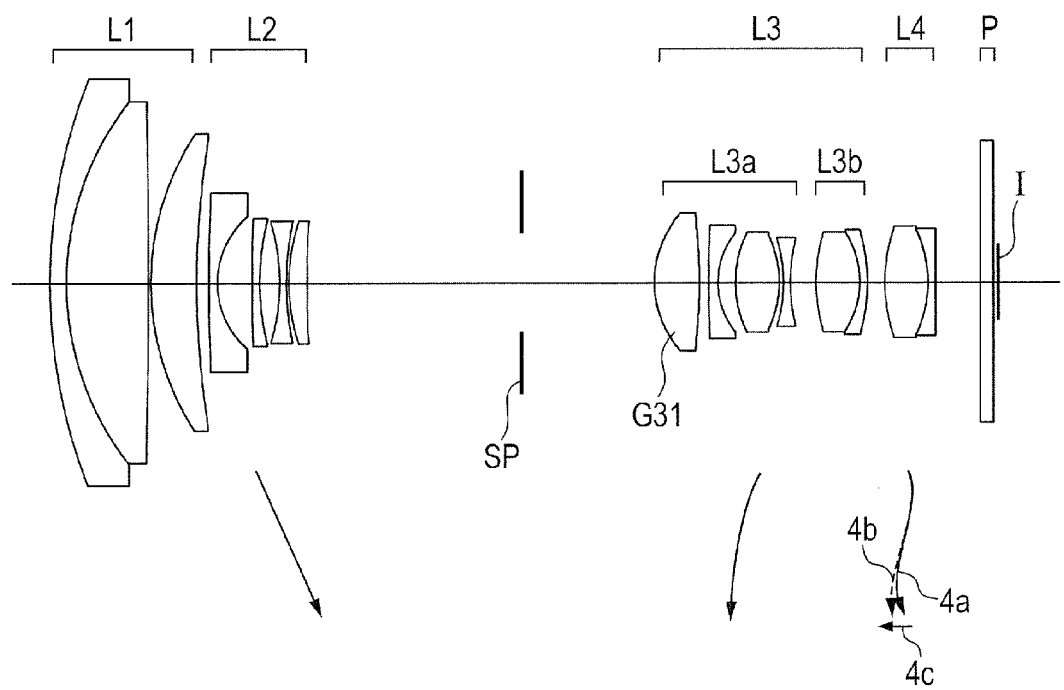
FIG. 7 is a lens cross-sectional view at a wide angle end of a zoom lens of Example 4.
Figure 8A:
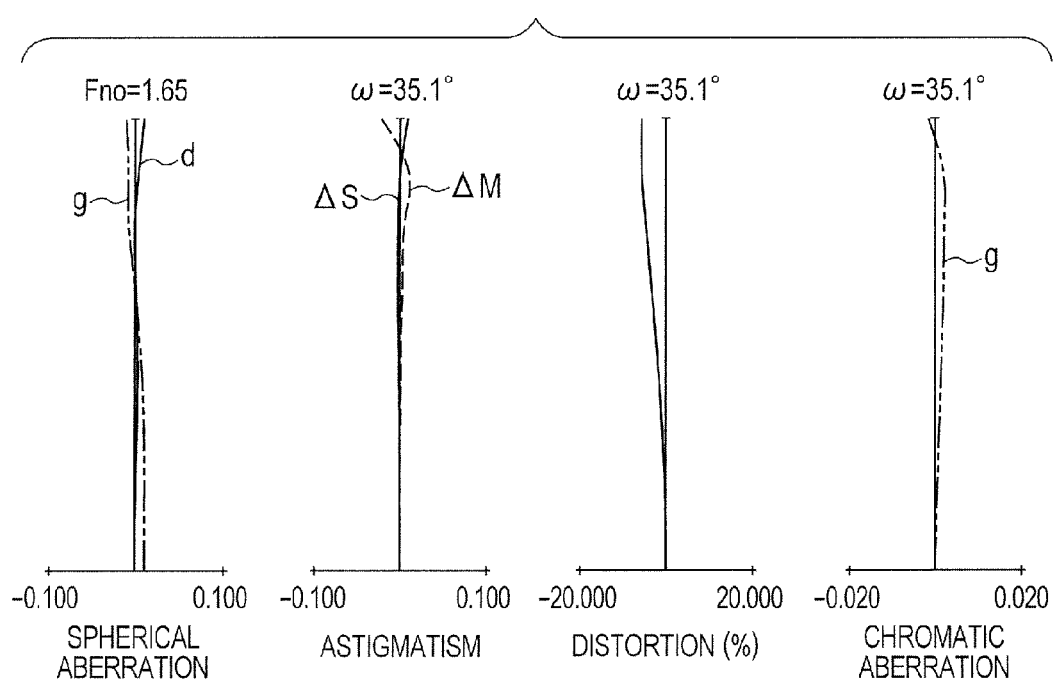
FIG. 8A is an aberration diagram of the zoom lens of Example 4 at the wide angle end.
Figure 8B:
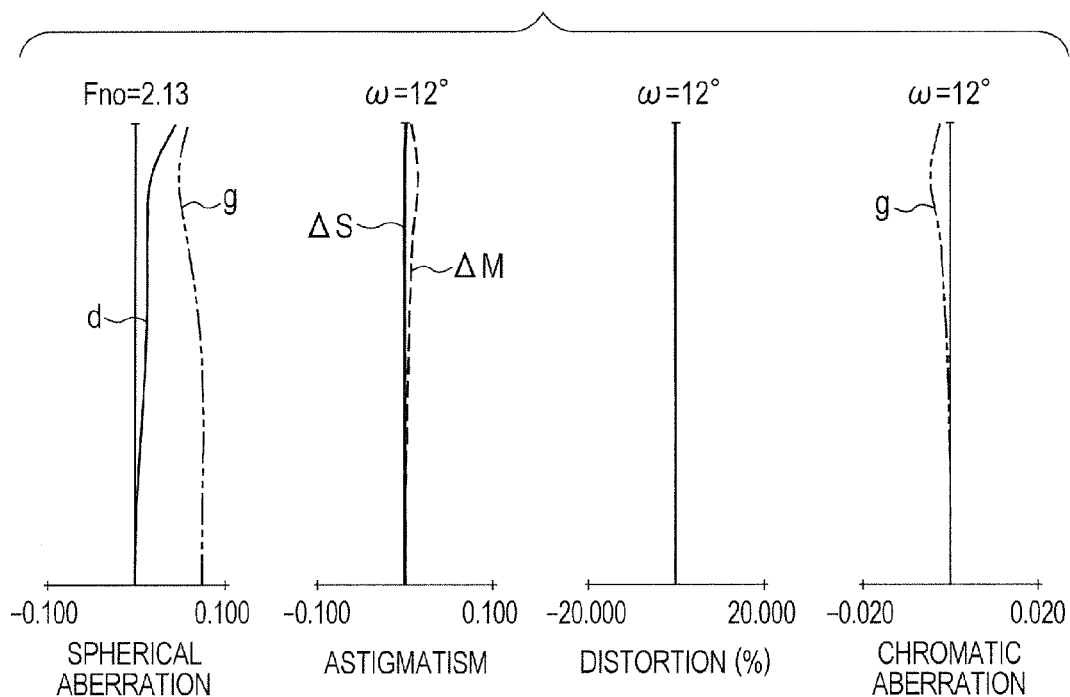
FIG. 8B is an aberration diagram of the zoom lens of Example 4 at an intermediate zoom position.
Figure 8C:
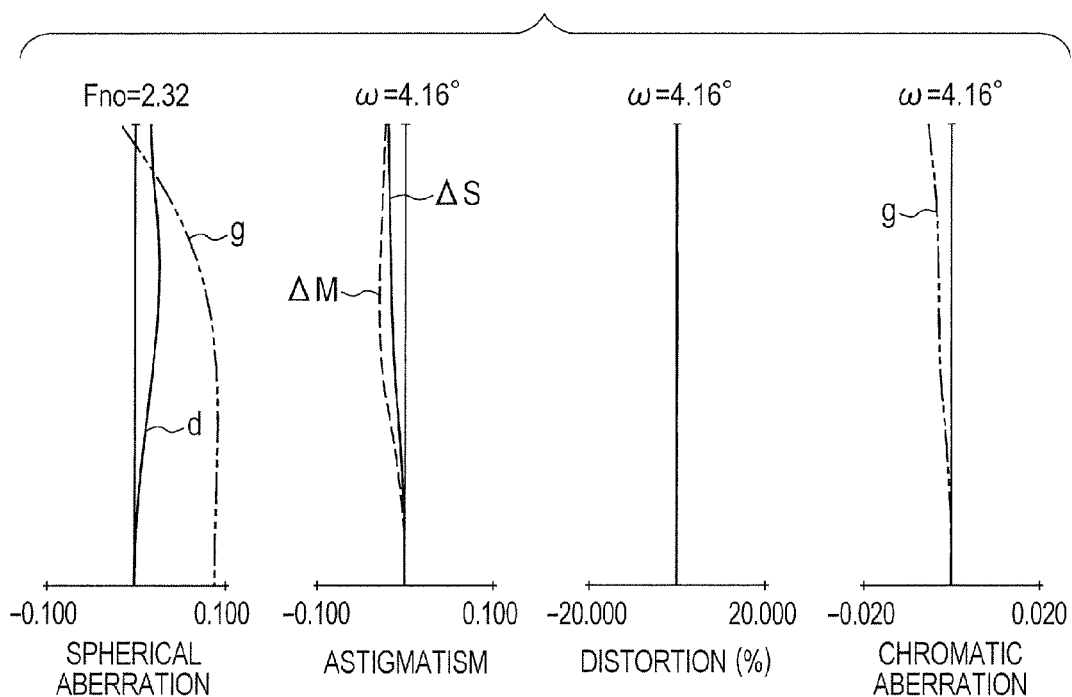
FIG. 8C is an aberration diagram of the zoom lens of Example 4 at a telephoto end.

FIG. 5 is a lens cross-sectional view at the wide angle end of a zoom lens according to Example 3. FIGS. 6A, 6B, and 6C are aberration diagrams of the zoom lens of Example 3 at the wide angle end, the intermediate zoom position, and the telephoto end, respectively, when focusing to the infinite object. FIG. 7 is a lens cross-sectional view at the wide angle end of a zoom lens according to Example 4. FIGS. 8A, 8B, and 8C are aberration diagrams of the zoom lens of Example 4 at the wide angle end, the intermediate zoom position, and the telephoto end, respectively, when focusing to the infinite object.

Figure 10B:
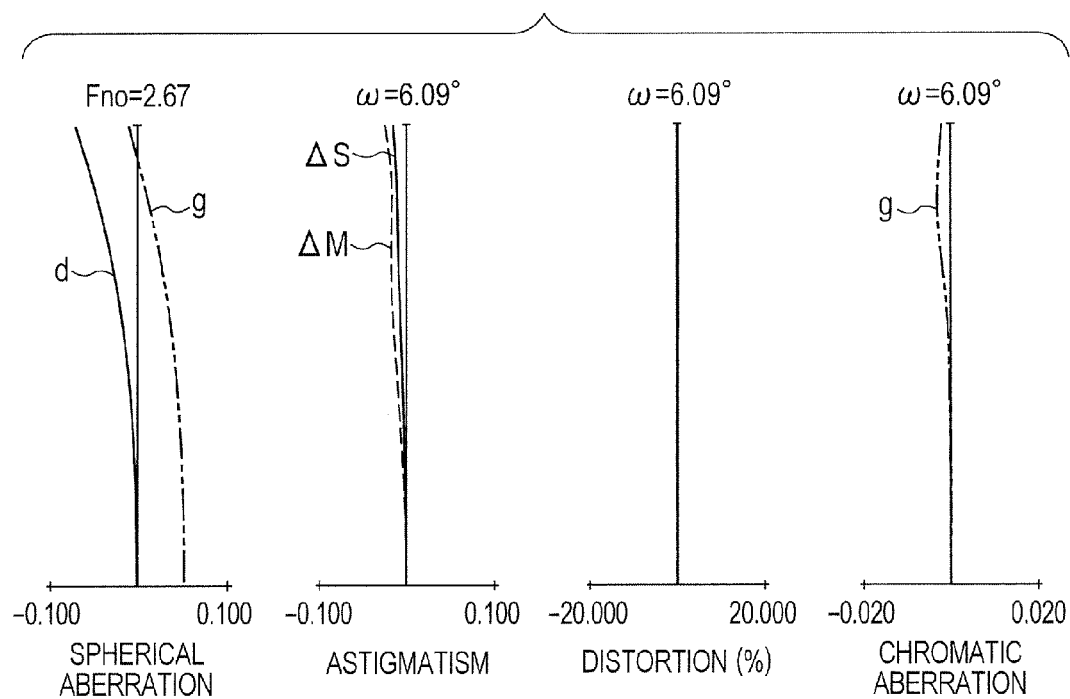
FIG. 10B is an aberration diagram of the zoom lens of Example 5 at an intermediate zoom position.
Figure 10C:
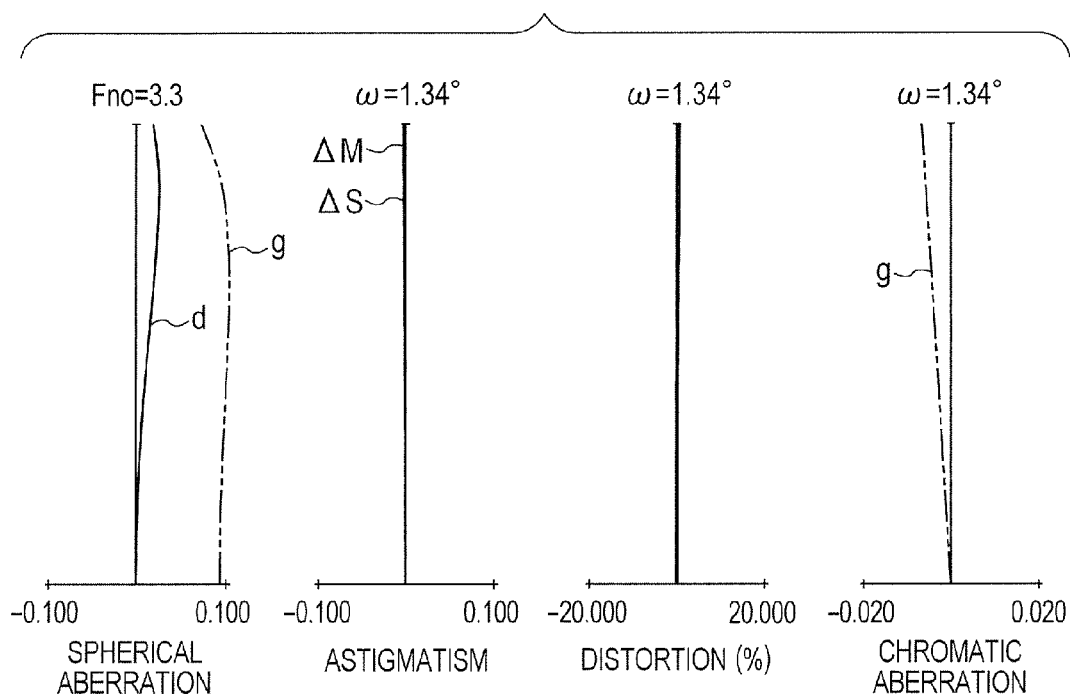
FIG. 10C is an aberration diagram of the zoom lens of Example 5 at a telephoto end.
Figure 11:
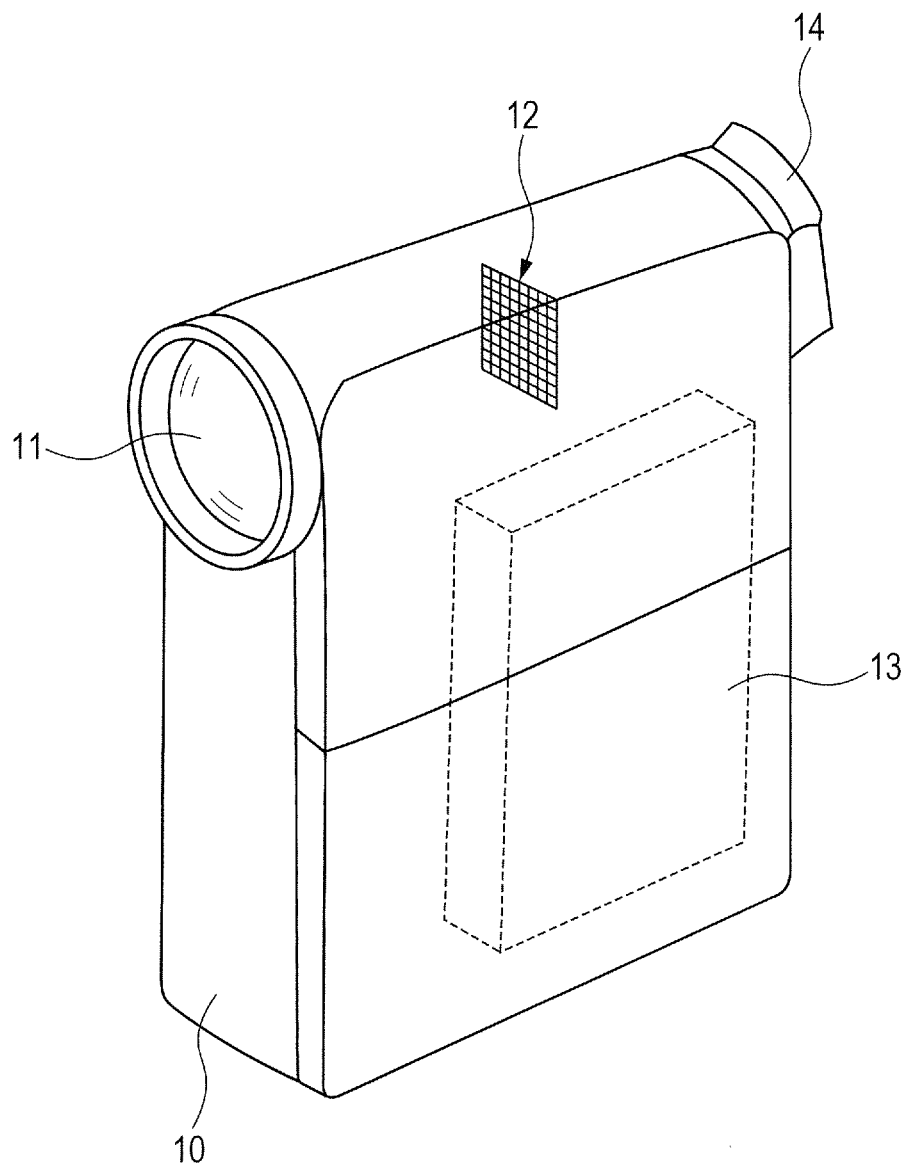
FIG. 11 is a schematic diagram of a main part of an image pickup apparatus according to the present invention.

FIG. 9 is a lens cross-sectional view at the wide angle end of a zoom lens according to Example 5. FIGS. 10A, 10B, and 10C are aberration diagrams of the zoom lens of Example 5 at the wide angle end, the intermediate zoom position, and the telephoto end, respectively, when focusing to the infinite object. FIG. 11 is a schematic diagram of a main part of a video camera (image pickup apparatus) which includes the zoom lens of the present invention.

In the lens cross-sectional views, a first lens unit L1 has a positive refractive power, a second lens unit L2 has a negative refractive power, a third lens unit L3 has a positive refractive power, and a fourth lens unit L4 has a positive refractive power. The third lens unit L3 includes a first lens subunit L1a having a positive refractive power, and a second lens subunit L3b having a positive refractive power, which is configured to move in a direction having a component of a direction perpendicular to the optical axis for the image blur correction. Note that, the movement for image stabilization may be swinging (rotational movement) with one point on the optical axis being a center of rotation.

An optical block P corresponds to an optical filter or a face plate, and indicates one unit having no refractive power in Numerical Examples to be described later. An image plane I is provided. When the zoom lens is used as a photographing optical system of a video camera or a digital still camera, the image plane I corresponds to an image pickup surface of a solid-state image pickup element (photo-electric conversion element) such as a CCD sensor or a CMOS sensor. When the zoom lens is used as a silver-halide film camera, the image plane I corresponds to a film surface. An aperture stop SP is arranged between the second lens unit L2 and the third lens unit L3.

The aperture stop SP indicates one unit in Numerical Examples to be described later. In the spherical aberration diagram, d is a d-line and g is a g-line. In the astigmatism diagram, $\Delta M$ is a meridional image plane, and $\Delta S$ is a sagittal image plane. The lateral chromatic aberration is represented by the g-line. An F-number is represented by Fno, and a half angle of field (degree) is represented by $\omega$. In the respective following Examples, the zoom positions at the wide angle end and the telephoto end are zoom positions where a zoom lens unit (second lens unit L2 in each of Examples) is located at both ends of a range in which the lens unit is mechanically movable on the optical axis.

The zoom lens according to the present invention comprises, in order from the object side to the image side, the first lens unit L1 having the positive refractive power, the second lens unit L2 having the negative refractive power, the third lens unit L3 having the positive refractive power, and the fourth lens unit L4 having the positive refractive power. This may realize an increase in magnification while downsizing the zoom lens. When the first lens unit L1 is decentered, large asymmetric components of image plane curvature are generated at the telephoto end. Therefore, the first lens unit L1 is configured not to move during zooming.

In each of Examples, during zooming from a wide angle end to a zoom position at the telephoto end, the second lens unit L2 is configured to move toward the image side. The third lens unit L3 is configured to move non-linearly toward the object side. The second lens unit L2 and the third lens unit L3 are moved to perform zooming. At this time, the third lens unit L3 is moved to be positioned further on the object side at an intermediate zoom position than at the wide angle end so that an entrance pupil position is shortened at the intermediate zoom position. This leads to a reduction in effective diameter of a front lens. The fourth lens unit L4 is moved to correct a variation in image plane position accompanying the zooming.

There is employed a rear focus system in which the fourth lens unit L4 is moved on the optical axis to perform focusing. A curve 4a indicated by the solid line and a curve 4b indicated by the dotted line of the fourth lens unit L4 are movement loci for correcting the image plane variation during zooming from the wide angle end to the zoom position at the telephoto end when focusing is performed on an infinite object and a short-distance object, respectively.

In each of Examples, for example, when focusing is shifted from the infinite object to the short-distance object at the zoom position at the telephoto end, the fourth lens unit L4 is extended forward as indicated by an arrow 4c.

In this Example, the lens units are separated by a change in lens interval accompanying zooming, and each of the lens units only needs to comprise at least one lens. The third lens unit L3 comprises at least two positive lenses and at least two negative lenses. The third lens unit L3 comprises a first lens subunit L3a and a second lens subunit L3b each having a positive refractive power. The second lens subunit L3b comprises a positive lens and a negative lens.

During the image blur correction, the second lens subunit L3b is configured to move in a direction having a component of a direction perpendicular to the optical axis. In this manner, the image stabilization is performed. When chromatic aberration generated in the first lens subunit L3a is corrected by the second lens subunit L3b, large lateral chromatic aberration and chromatic coma occur due to decentering during the image blur correction. Therefore, a positive lens and a negative lens are arranged in each of the first lens subunit L3a and the second lens subunit L3b so that the chromatic aberration is corrected by each of the first lens subunit L3a and the second lens subunit L3b. Moreover, of the lenses of the third lens unit L3, as a lens is arranged further on the object side, an effective diameter thereof tends to become larger when the zoom ratio and an aperture ratio are increased.

As a lens unit for the image blur correction becomes smaller in size and weight, downsizing of a lens barrel and an actuator becomes easier. By arranging the second lens subunit L3b, which is the lens unit for the image blur correction, on the image side of the first lens subunit L3a having the positive refractive power, downsizing of the lens unit for the image blur correction may be realized.

Further, the second lens subunit L3b is configured so that the second lens subunit L3b includes the positive lens and the negative lens. This realizes the downsizing while correcting the chromatic aberration.

In each of Examples, a focal length of the second lens unit L2 is represented by f2, a focal length of the third lens unit L3 is represented by f3, and a focal length of the second lens subunit L3b is represented by f3b. At this time, the following conditional expressions are satisfied:

$$-3.9 < f3/f2 < -2.2 \quad (1)$$

$$0.9 < f3b/f3 < 1.6 \quad (2).$$

The conditional expression (1) is an expression that defines a ratio between the focal length of the second lens unit L2 and the focal length of the third lens unit L3. Below the lower limit value of the conditional expression (1), zooming action by the movement of the third lens unit L3 is reduced, with the result that an entrance pupil is lengthened at the intermediate zoom position to disadvantageously increase the effective diameter of the front lens. On the contrary, above the upper limit value, the positive refractive power of the third lens unit L3 becomes disadvantageously strong to increase higher-order aberrations, for example, the coma by the first lens subunit L3a, on which light is incident in a state in which a beam diameter is large, especially at the wide angle end, and it becomes difficult to correct those various aberrations.

The conditional expression (2) is an expression that defines a ratio between the focal lengths of the second lens subunit L3b and the third lens unit L3. Above the upper limit value of the conditional expression (2), when the image blur correction is performed by the second lens subunit L3b, an amount of moving so as to have the component of the direction perpendicular to the optical axis is disadvantageously increased, which increases sizes of the lens barrel and the actuator.

Below the lower limit value of the conditional expression (2), where the focal length f3b of the second lens subunit L3b becomes short, the positive refractive power of the second lens subunit L3b becomes too strong, and a large variation in image plane curvature occurs during the image blur correction, which is disadvantageous. Moreover, below the lower limit value of the conditional expression (2), where the second lens subunit L3b has a negative refractive power, in order to maintain the positive refractive power in the third lens unit L3, there arises a need to strengthen the refractive power of the first lens subunit L3a. This results in occurrences of large higher-order aberrations, in particular, chromatic coma at the wide angle end, which occur in the first lens subunit L3a, which is disadvantageous.

As described above, according to the present invention, the zoom lens that is bright over a wide angle of field, is small in size, and has a small lens unit for the image blur correction, and an image pickup apparatus including the zoom lens are obtained.

In each of Examples, it is more preferred to satisfy at least one of the following conditional expressions. A zoom ratio of the zoom lens is represented by z, and a movement amount of the second lens unit L2 during zooming from the wide angle end to the telephoto end is represented by m2. A movement amount of the third lens unit L3 during the zooming from the wide angle end to the telephoto end is represented by m3. The term "movement amount" as used herein refers to a difference between positions on the optical axis of each of the lens units at the wide angle end and the telephoto end, and a sign of the movement amount is positive in a case of being positioned further on the image side at the telephoto end than at the wide angle end.

A focal length of a positive lens that is arranged closest to the object side of the positive lenses of the third lens unit L3 is represented by f3fp. A distance on the optical axis from a surface that is closest to the object side to a surface that is closest to the image side of the third lens unit L3 is represented by D3, and a distance on the optical axis from a surface that is closest to the object side to a surface that is closest to the image side of the fourth lens unit L4 is represented by D4. A focal length of the first lens subunit L3a is represented by f3a. A specific gravity of a material of each lens forming the second lens subunit L3b is represented by sib. An average value of Abbe numbers of materials of positive lenses included in the first lens subunit is represented by v3apav. An average value of Abbe numbers of materials of negative lenses included in the first lens subunit is represented by v3anav.

An Abbe number of a material of the positive lens of the second lens subunit is represented by v3bp, and an Abbe number of a material of the negative lens of the second lens subunit is represented by v3bn. A focal length of the zoom lens at the wide angle end is represented by fw, and an entrance pupil position (distance from the first lens surface) at the wide angle end is represented by T1w. A focal length of the zoom lens at the intermediate zoom position is represented by fm, and an entrance pupil position at the intermediate zoom position is represented by Tim. The term "intermediate zoom position" as used herein refers to an arbitrary position in a range of the movement amounts from m2×0.55 to m2×0.8 of the second lens unit L2. Moreover, when the image pickup apparatus including the zoom lens of each of Examples and an image pickup element is used, a diagonal length of a use range of the image pickup element is represented by 2Y. At this time, it is preferred to satisfy at least one of the following conditional expressions.

$$-5.1 < z \times m3/m2 < -1.8 \quad (3)$$

$$1.5 < f3b/f3fp < 2.9 \quad (4)$$

$$3.0 < D3/D4 < 14.0 \quad (5)$$

$$0.7 < f3b/f3a < 1.1 \quad (6)$$

$$s3b < 4.5 \quad (7)$$

$$1.3 < \nu 3apav/\nu 3anav < 4.0 \quad (8)$$

$$1.3 < \nu 3bp/\nu 3bn < 4.0 \quad (9)$$

$$0.7 < (T1m/fm)/(T1w/fw) < 1.2 \quad (10)$$

$$2.1 < f3b/2Y < 7.5 \quad (11)$$

Next, technical meanings of each of the conditional expressions described above are described.

The conditional expression (3) is an expression that defines a ratio between the movement amount of the second lens unit L2 during the zooming from the wide angle end to the telephoto end and the movement amount of the third lens unit L3 during the zooming from the wide angle end to the telephoto end. Above the upper limit value of the conditional expression (3), a movement amount of the entrance pupil, which is moved by the movement of the third lens unit L3 during the zooming, becomes smaller, which makes it difficult to increase the angle of field while reducing the effective diameter of the front lens. On the contrary, below the lower limit value, the movement amount of the third lens unit L3 during the zooming is increased, and a zooming load of the third lens unit L3 is increased.

However, the third lens unit L3 has less contribution to the zooming than that of the second lens unit L2, with the result that it is difficult to increase the zoom ratio despite the increase in movement amount, and the zoom lens is increased in size to the contrary.

The conditional expression (4) is an expression that defines a ratio between the focal length of the positive lens G31, which is arranged closest to the object side of the third lens unit L3, and the focal length of the second lens subunit L3b. Above the upper limit value of the conditional expression (4), where a positive refractive power of the positive lens G31 becomes strong, spherical aberration and coma are increased at the wide angle end, and it becomes difficult to correct those various aberrations. On the contrary, below the lower limit value, where the positive refractive power of the positive lens G31 becomes weak, a diameter of a beam that passes through the second lens subunit L3b is increased, and the second lens subunit L3b for the image blur correction as well as the lens barrel and the actuator is increased in size.

The conditional expression (5) is an expression that defines a ratio between the distance (lens unit thickness) from the lens surface that is closest to the object side to the lens surface that is closest to the image side of the third lens unit L3 and the distance (lens unit thickness) from the lens surface that is closest to the object side to the lens surface that is closest to the image side of the fourth lens unit L4. Above the upper limit value of the conditional expression (5), where the lens unit thickness of the third lens unit L3 becomes thick, a total lens length becomes long. On the contrary, below the lower limit value, where the lens unit thickness of the fourth lens unit L4 becomes thick, a total lens length becomes long, or it becomes difficult to configure the third lens unit L3 to have at least two positive lenses and at least two negative lenses.

The conditional expression (6) is an expression that defines a ratio between the focal length of the first lens subunit L3a and the focal length of the second lens subunit L3b. Above the upper limit value of the conditional expression (6), where the positive refractive power of the first lens subunit L3a becomes strong, the spherical aberration and the coma are increased at the wide angle end, and it becomes difficult to correct those various aberrations. On the contrary, below the lower limit value, aberrations generated in the second lens subunit L3b are increased, and the large variation in image plane curvature occurs during the image blur correction, which is disadvantageous.

The conditional expression (7) is an expression that defines the specific gravity of the material of each lens used in the second lens subunit L3b. In each of Examples, it is defined that the second lens subunit L3b includes a positive lens and a negative lens, and that both lenses satisfy the conditional expression (7). Above the upper limit value of the conditional expression (7), in order to obtain thrust for driving the second lens subunit L3b for the image blur correction, the actuator is disadvantageously increased in size.

The conditional expression (8) is an expression that defines a ratio between the average value of the Abbe numbers of the materials of the positive lenses included in the first lens subunit L3a and the average value of the Abbe numbers of the materials of the negative lenses included in the first lens subunit L3a. Above the upper limit value of the conditional expression (8), less optical glass is used in the optical system, and flexibility in correcting various aberrations is reduced, which is disadvantageous. On the contrary, below the lower limit value, it becomes difficult to correct the chromatic aberration generated by the first lens subunit L3a with the second lens subunit L3b, and further, large lateral chromatic aberration and chromatic coma due to the decentering occur during the image blur correction.

The conditional expression (9) is an expression that defines a ratio between the Abbe number of the material of the positive lens of the second lens subunit L3b and the Abbe number of the material of the negative lens of the second lens subunit L3b. Above the upper limit value of the conditional expression (9), less optical glass is used in the optical system, and the flexibility in correcting various aberrations is reduced, which is disadvantageous. On the contrary, below the lower limit value, it becomes difficult to correct chromatic aberration generated by the second lens subunit L3b with the first lens subunit L3a, and further, large lateral chromatic aberration and chromatic coma due to the decentering occur during the image blur correction.

The conditional expression (10) defines a ratio between the following two ratios: a ratio between the focal length of the zoom lens and the entrance pupil position at the wide angle end, and a ratio between the focal length of the zoom lens and the entrance pupil position at the intermediate zoom position. The effective diameter of the front lens tends to become larger as the angle of field is made wider, but when the entrance pupil position is long relative to the focal length, the effective diameter of the front lens becomes even larger. Therefore, above the upper limit value of the conditional expression (10), the ratio between the focal length of the zoom lens and the entrance pupil position becomes dominant in determining the effective diameter of the front lens at the intermediate zoom position, with the result that the effective diameter of the front lens is disadvantageously increased even at the same angle of field at the wide angle end, which makes it difficult to increase the angle of field and downsize the zoom lens.

On the contrary, below the lower limit value, the distance by which the third lens unit L3 is moved from the wide angle end to the intermediate zoom position becomes longer in order to shorten the entrance pupil position at the intermediate zoom position. As a result, a combined change in aberration of the third lens unit L3 and the fourth lens unit L4 is increased to increase a change in image plane curvature from the wide angle end to the intermediate zoom position, and it becomes difficult to correct the change.

The conditional expression (11) is an expression that defines a ratio between the focal length of the second lens subunit L3b and the diagonal length of the use range of the image pickup element. Above the upper limit value of the conditional expression (11), the amount of moving so as to have the component of the direction perpendicular to the optical axis during the image blur correction becomes large relative to effective dimensions of the image pickup element, and the image pickup apparatus is increased in size. Below the lower limit value of the conditional expression (11), where the positive refractive power of the second lens subunit L3b becomes strong, a change in optical characteristic during the image blur correction, in particular, the change in image plane curvature before and after the image blur correction is increased, and it becomes difficult to correct the change. Note that, it is more preferred to specify the numerical value ranges of the conditional expressions (1) to (11) as follows.

$$-3.4 < f3/f2 < -2.3 \quad (1a)$$

$$1.1 < f3b/f3 < 1.4 \quad (2a)$$

$$-4.9 < zxm3/m2 < -1.9 \quad (3a)$$

$$1.7 < f3b/f3p < 2.8 \quad (4a)$$

$$3.7 < D3/D4 < 12.3 \quad (5a)$$

$$0.73 < f3b/f3a < 1.07 \quad (6a)$$

$$s3b < 4.4 \quad (7a)$$

$$1.5 < v3apav/v3anav < 2.7 \quad (8a)$$

$$1.4 < v3bp/v3bn < 2.7 \quad (9a)$$

$$0.8 < (T1m/fm)/(T1w/fw) < 1.1 \quad (10a)$$

$$2.3 < f3b/2Y < 7.0 \quad (11a)$$

Moreover, in the present invention, it is desired that an aperture stop SP be interposed between the second lens unit L2 and the third lens unit L3, and that the aperture stop be configured not to move during zooming.

In the four-unit zoom lens according to the present invention, in order to allow an off-axial beam to pass through an aperture diameter even when the aperture stop SP is narrowed down, the aperture stop SP is generally arranged between the second lens unit L2 and the third lens unit L3 or in the third lens unit L3. However, moving the aperture stop SP during zooming leads to an increase in number of actuators and an increase in size of the lens barrel. Therefore, in the present invention, the aperture stop SP is arranged between the second lens unit L2 and the third lens unit L3 and configured not to move during zooming.

Numerical Examples 1 to 5 corresponding to Examples 1 to 5 are described below. In each of Numerical Examples, i indicates the order of surfaces from the object side, ri is the curvature radius of i-th (i-th surface), di is an interval between the i-th surface and i+1-th surface, ndi and vdi are the refractive index and Abbe number of a material of the i-th optical member based on the d-line, respectively. In Numerical Examples 1 to 5, two surfaces closest to the image side correspond to surfaces corresponding to the optical blocks. It is assumed that in the aspherical configuration, a displacement at a position of the height H from the optical axis in the optical axis direction is X based on the surface apex. It is assumed that the traveling direction of light is positive, R is a radius of paraxial curvature, k is a conic constant, and A4, A6, A8, and A10 are aspherical coefficients, respectively. In this case, the displacement X is represented by the following expression.

$$X = \frac{\frac{H^2}{R}}{1+\sqrt{1-(1+k)\left(\frac{H}{R}\right)^2}} + A4H^4 + A6H^6 + A8H^8 + A10H^{10}$$

Symbol * means a surface having an aspherical configuration. "e-x" means $10^{-x}$. An air-equivalent back focus is represented by BF. The total lens length is a value obtained by adding the back focus to the distance from the first lens surface to the final lens surface. The half angle of field is a value determined by ray tracing. An entrance pupil position is represented by T1. A relationship between the above-mentioned respective conditional expressions and various numerical values in Numerical Examples is shown in Table 1.

| Numerical Example 1 Unit mm Surface data | | | | |
|---|---|---|---|---|
| Surface number | r | d | nd | vd |
| 1 | 87.623 | 2.70 | 1.85478 | 24.8 |
| 2 | 50.853 | 10.70 | 1.49700 | 81.5 |
| 3 | 970.631 | 0.17 | | |
| 4 | 66.904 | 5.38 | 1.83481 | 42.7 |
| 5 | 272.955 | (Variable) | | |
| 6 | 1,524.393 | 1.36 | 1.83481 | 42.7 |
| 7 | 16.865 | 6.23 | | |
| 8 | −175.054 | 1.01 | 1.60311 | 60.6 |
| 9 | 50.468 | 3.57 | | |
| 10 | −35.069 | 1.21 | 1.48749 | 70.2 |
| 11 | 776.374 | 1.88 | | |
| 12 | 57.431 | 2.06 | 1.95906 | 17.5 |
| 13 | 1,309.647 | (Variable) | | |
| 14 (Stop) | ∞ | (Variable) | | |
| 15* | 19.977 | 4.64 | 1.58313 | 59.4 |
| 16* | −46.389 | 4.25 | | |
| 17 | −3272.901 | 0.67 | 1.60342 | 38.0 |
| 18 | 18.975 | 6.94 | | |
| 19 | 1,328.858 | 5.13 | 1.48749 | 70.2 |
| 20 | −22.780 | 0.17 | | |
| 21 | −42.360 | 0.70 | 1.58144 | 40.8 |
| 22 | 40.245 | 1.64 | | |
| 23 | 37.811 | 4.79 | 1.48749 | 70.2 |
| 24 | −18.687 | 0.78 | 1.74400 | 44.8 |
| 25 | −37.779 | (Variable) | | |
| 26 | 38.676 | 6.52 | 1.49700 | 81.5 |
| 27 | −17.346 | 1.09 | 1.51742 | 52.4 |
| 28 | −59.717 | (Variable) | | |
| 29 | ∞ | 2.78 | 1.51633 | 64.1 |
| 30 | ∞ | 1.00 | | |
| Image plane | ∞ | | | |

Aspherical surface data

Fifteenth surface

K = −3.30425e+000 A4 = 4.34285e−005 A6 = −1.56281e−007
A8 = 9.39308e−010 A10 = −1.77648e−012

Sixteenth surface

K = −2.97840e+001 A4 = −1.26495e−005 A6 = 9.80886e−008
A8 = −8.57213e−011

-continued

Numerical Example 1
Unit mm
Surface data

Various data
Zoom ratio 4.70

|  | Wide angle | Intermediate | Telephoto |
|---|---|---|---|
| Focal length | 9.30 | 23.36 | 43.70 |
| F-number | 2.06 | 2.60 | 2.65 |
| Half angle of field (degree) | 42.4 | 18.8 | 10.4 |
| Image height | 7.14 | 7.93 | 7.93 |
| Total lens length | 156.58 | 156.58 | 156.58 |
| BF | 21.12 | 29.60 | 37.35 |
| T1 | 33.51 | 80.40 | 134.59 |
| d5 | 1.15 | 21.60 | 35.22 |
| d13 | 39.12 | 18.68 | 5.05 |
| d14 | 17.44 | 4.21 | 3.09 |
| d25 | 4.14 | 8.89 | 2.27 |
| d28 | 18.29 | 26.77 | 34.51 |

Zoom lens unit data

| Unit | First surface | Focal length |
|---|---|---|
| 1 | 1 | 86.61 |
| 2 | 6 | −15.81 |
| 3 | 14 | ∞ |
| 4 | 15 | 42.91 |
| 5 | 26 | 50.39 |
| 6 | 29 | ∞ | f3a = 69.733
f3b = 53.723
f3fp = 24.579

Numerical Example 2
Unit mm
Surface data

| Surface number | r | d | nd | νd |
|---|---|---|---|---|
| 1 | 58.427 | 1.75 | 1.85478 | 24.8 |
| 2 | 31.430 | 7.31 | 1.49700 | 81.5 |
| 3 | 411.755 | 0.17 | | |
| 4 | 32.292 | 5.38 | 1.80400 | 46.6 |
| 5 | 149.281 | (Variable) | | |
| 6 | 413.905 | 0.98 | 1.83481 | 42.7 |
| 7 | 11.808 | 4.38 | | |
| 8 | 1,535.890 | 0.73 | 1.63854 | 55.4 |
| 9 | 30.494 | 3.01 | | |
| 10 | −22.344 | 0.70 | 1.48749 | 70.2 |
| 11 | 288.871 | 0.17 | | |
| 12 | 34.927 | 1.76 | 1.95906 | 17.5 |
| 13 | 518.903 | (Variable) | | |
| 14 (Stop) | ∞ | (Variable) | | |
| 15* | 16.479 | 5.62 | 1.62229 | 53.3 |
| 16* | −50.071 | 4.07 | | |
| 17 | 83.026 | 0.60 | 1.72825 | 28.5 |
| 18 | 14.396 | 0.72 | | |
| 19 | 18.635 | 2.24 | 1.49782 | 67.0 |
| 20 | 21.104 | 5.69 | | |
| 21 | 28.087 | 5.48 | 1.48749 | 70.2 |
| 22 | −14.695 | 0.76 | 1.74000 | 28.3 |
| 23 | −28.690 | (Variable) | | |
| 24 | 40.500 | 3.29 | 1.49700 | 81.5 |
| 25 | −83.504 | (Variable) | | |
| 26 | ∞ | 2.78 | 1.51633 | 64.1 |
| 27 | ∞ | 1.00 | | |
| Image plane | ∞ | | | |

Numerical Example 2
Unit mm
Surface data

Aspherical surface data

Fifteenth surface

K = −2.69230e+000 A4 = 5.45306e−005 A6 = −1.48901e−007
A8 = 1.17373e−009 A10 = −6.90052e−013

Sixteenth surface

K = −3.32947e+001 A4 = −9.75944e−006 A6 = 1.17407e−007
A8 = 2.14739e−010

Various data
Zoom ratio 4.53

|  | Wide angle | Intermediate | Telephoto |
|---|---|---|---|
| Focal length | 10.82 | 26.92 | 48.96 |
| F-number | 2.06 | 2.60 | 2.62 |
| Half angle of field (degree) | 36.9 | 16.8 | 9.34 |
| Image height | 7.14 | 7.93 | 7.93 |
| Total lens length | 111.18 | 111.18 | 111.18 |
| BF | 15.83 | 25.07 | 28.04 |
| T1 | 26.70 | 57.13 | 92.75 |
| d5 | 0.98 | 11.67 | 18.80 |
| d13 | 19.47 | 8.78 | 1.65 |
| d14 | 12.48 | 3.56 | 3.11 |
| d23 | 7.60 | 7.27 | 4.75 |
| d25 | 13.00 | 22.24 | 25.21 |

Zoom lens unit data

| Unit | First surface | Focal length |
|---|---|---|
| 1 | 1 | 46.37 |
| 2 | 6 | −11.04 |
| 3 | 14 | ∞ |
| 4 | 15 | 28.69 |
| 5 | 24 | 55.36 |
| 6 | 26 | ∞ | f3a = 40.324
f3b = 39.369
f3fp = 20.591

Numerical Example 3
Unit mm
Surface data

| Surface number | r | d | nd | νd |
|---|---|---|---|---|
| 1 | 54.772 | 1.79 | 1.85478 | 24.8 |
| 2 | 30.857 | 7.43 | 1.49700 | 81.5 |
| 3 | 226.066 | 0.17 | | |
| 4 | 32.737 | 5.61 | 1.80400 | 46.6 |
| 5 | 150.152 | (Variable) | | |
| 6 | 299.071 | 1.02 | 1.83481 | 42.7 |
| 7 | 12.332 | 4.56 | | |
| 8 | −1,004.015 | 0.76 | 1.67790 | 50.7 |
| 9 | 32.378 | 3.03 | | |
| 10 | −23.635 | 1.81 | 1.48749 | 70.2 |
| 11 | 485.846 | 0.17 | | |
| 12 | 39.503 | 2.03 | 1.95906 | 17.5 |
| 13 | 1,587.304 | (Variable) | | |
| 14 (Stop) | ∞ | (Variable) | | |
| 15* | 16.911 | 5.50 | 1.61272 | 58.7 |
| 16* | −55.232 | 5.53 | | |
| 17 | 37.723 | 0.60 | 1.80809 | 22.8 |
| 18 | 14.941 | 8.71 | | |
| 19 | 24.258 | 4.63 | 1.49782 | 67.0 |
| 20 | −21.730 | 0.93 | | |
| 21 | −18.520 | 0.73 | 1.78472 | 25.7 |

Numerical Example 3
Unit mm
Surface data

| | | | | |
|---|---|---|---|---|
| 22 | −31.451 | (Variable) | | |
| 23 | 45.599 | 2.27 | 1.49700 | 81.5 |
| 24 | −219.269 | (Variable) | | |
| 25 | ∞ | 2.78 | 1.51633 | 64.1 |
| 26 | ∞ | 1.00 | | |
| Image plane | ∞ | | | |

Aspherical surface data

Fifteenth surface

K = −2.96251e+000 A4 = 5.61609e−005 A6 = −1.48370e−007
A8 = 1.11808e−009 A10 = −1.64773e−014

Sixteenth surface

K = −3.98851e+001 A4 = −7.23135e−006 A6 = 1.29213e−007
A8 = 2.28035e−010

Various data
Zoom ratio 4.64

| | Wide angle | Intermediate | Telephoto |
|---|---|---|---|
| Focal length | 10.82 | 27.08 | 50.14 |
| F-number | 2.06 | 2.65 | 2.73 |
| Half angle of field (degree) | 36.9 | 16.8 | 9.16 |
| Image height | 7.14 | 7.93 | 7.93 |
| Total lens length | 111.46 | 111.46 | 111.46 |
| BF | 14.07 | 20.80 | 24.23 |
| T1 | 27.99 | 60.07 | 98.67 |
| d5 | 0.97 | 11.85 | 19.11 |
| d13 | 19.99 | 9.10 | 1.85 |
| d14 | 13.42 | 4.44 | 3.11 |
| d22 | 5.73 | 7.98 | 5.88 |
| d24 | 11.24 | 17.97 | 21.40 |

Zoom lens unit data

| Unit | First surface | Focal length |
|---|---|---|
| 1 | 1 | 47.61 |
| 2 | 6 | −11.61 |
| 3 | 14 | ∞ |
| 4 | 15 | 27.72 |
| 5 | 23 | 76.17 |
| 6 | 25 | ∞ | f3a = 37.462
f3b = 38.025
f3fp = 21.761

Numerical Example 4
Unit mm
Surface data

| Surface number | r | d | nd | vd |
|---|---|---|---|---|
| 1 | 44.098 | 1.32 | 1.85478 | 24.8 |
| 2 | 23.185 | 6.42 | 1.59522 | 67.7 |
| 3 | −638.516 | 0.17 | | |
| 4 | 21.426 | 3.63 | 1.71300 | 53.9 |
| 5 | 73.924 | (Variable) | | |
| 6 | 320.985 | 0.60 | 1.83481 | 42.7 |
| 7 | 6.849 | 2.76 | | |
| 8 | 185.189 | 0.60 | 1.79952 | 42.2 |
| 9 | 19.814 | 1.50 | | |
| 10 | −17.064 | 0.60 | 1.45600 | 90.3 |
| 11 | 22.499 | 0.17 | | |
| 12 | 15.242 | 1.43 | 1.95906 | 17.5 |
| 13 | 60.639 | (Variable) | | |
| 14 (Stop) | ∞ | (Variable) | | |
| 15* | 7.834 | 3.55 | 1.75501 | 51.2 |
| 16* | −30.168 | 0.72 | | |
| 17 | 143.347 | 0.71 | 1.80100 | 35.0 |
| 18 | 6.125 | 1.41 | | |
| 19 | 8.922 | 3.37 | 1.43875 | 94.9 |
| 20 | −9.262 | 0.32 | | |
| 21 | −11.770 | 0.60 | 1.57956 | 53.9 |
| 22 | 13.937 | 2.04 | | |
| 23 | 13.058 | 3.37 | 1.48656 | 84.5 |
| 24 | −7.349 | 0.60 | 1.72000 | 42.0 |
| 25 | −14.520 | (Variable) | | |
| 26 | 13.246 | 3.35 | 1.49700 | 81.5 |
| 27 | −9.288 | 0.60 | 1.48749 | 70.2 |
| 28 | 1,687.678 | (Variable) | | |
| 29 | ∞ | 1.06 | 1.51633 | 64.1 |
| 30 | ∞ | 1.00 | | |
| Image plane | ∞ | | | |

Aspherical surface data

Fifteenth surface

K = −1.13742e+000 A4 = 1.74386e−004 A6 = 1.28080e−006
A8 = 1.63173e−016

Sixteenth surface

K = −8.11629e+000 A4 = 2.19279e−004 A6 = −1.57913e−006

Various data
Zoom ratio 9.68

| | Wide angle | Intermediate | Telephoto |
|---|---|---|---|
| Focal length | 4.12 | 13.64 | 39.89 |
| F-number | 1.65 | 2.13 | 2.32 |
| Half angle of field (degree) | 35.1 | 12.0 | 4.16 |
| Image height | 2.73 | 2.90 | 2.90 |
| Total lens length | 74.82 | 74.82 | 74.82 |
| BF | 5.22 | 7.37 | 7.10 |
| T1 | 19.63 | 54.73 | 122.55 |
| d5 | 0.98 | 10.07 | 16.14 |
| d13 | 16.93 | 7.83 | 1.77 |
| d14 | 10.40 | 4.35 | 3.09 |
| d25 | 1.46 | 5.36 | 6.90 |
| d28 | 3.52 | 5.67 | 5.40 |

Zoom lens unit data

| Unit | First surface | Focal length |
|---|---|---|
| 1 | 1 | 30.73 |
| 2 | 6 | −6.04 |
| 3 | 14 | ∞ |
| 4 | 15 | 16.36 |
| 5 | 26 | 26.18 |
| 6 | 29 | ∞ | f3a = 21.757
f3b = 18.714
f3fp = 8.582

Numerical Example 5
Unit mm
Surface data

| Surface number | r | d | nd | vd |
|---|---|---|---|---|
| 1 | 154.380 | 1.76 | 1.80610 | 33.3 |
| 2 | 48.911 | 6.68 | 1.43700 | 95.1 |
| 3 | −191.883 | 0.17 | | |
| 4 | 65.434 | 3.13 | 1.49700 | 81.5 |

-continued

Numerical Example 5
Unit mm
Surface data

| | | | | |
|---|---|---|---|---|
| 5 | 393.082 | 0.17 | | |
| 6 | 35.355 | 4.36 | 1.59522 | 67.7 |
| 7 | 136.223 | (Variable) | | |
| 8 | 118.188 | 0.79 | 1.88300 | 40.8 |
| 9 | 8.067 | 3.39 | | |
| 10 | 466.002 | 0.60 | 2.00069 | 25.5 |
| 11 | 53.941 | 1.32 | | |
| 12 | −22.700 | 0.75 | 1.91082 | 35.3 |
| 13 | 54.499 | 0.19 | | |
| 14 | 24.698 | 2.16 | 2.10205 | 16.8 |
| 15 | −98.944 | (Variable) | | |
| 16 (Stop) | ∞ | (Variable) | | |
| 17* | 11.851 | 3.54 | 1.75501 | 51.2 |
| 18* | −75.163 | 1.61 | | |
| 19 | 408.966 | 0.75 | 1.74950 | 35.3 |
| 20 | 10.310 | 0.39 | | |
| 21 | 13.233 | 3.63 | 1.43387 | 95.1 |
| 22 | −13.688 | 0.17 | | |
| 23 | −19.138 | 0.60 | 1.61272 | 58.7 |
| 24 | 16.034 | 2.06 | | |
| 25 | 33.988 | 2.50 | 1.49700 | 81.5 |
| 26 | −11.947 | 0.60 | 1.69680 | 55.5 |
| 27 | −23.512 | (Variable) | | |
| 28 | 16.243 | 2.97 | 1.59522 | 67.7 |
| 29 | −16.217 | 0.60 | 1.90366 | 31.3 |
| 30 | −36.089 | (Variable) | | |
| 31 | ∞ | 2.01 | 1.51633 | 64.1 |
| 32 | ∞ | 1.00 | | |
| Image plane | ∞ | | | |

Aspherical surface data

Seventeenth surface

K = −1.04299e+000 A4 = 4.53942e−005 A6 = 1.60642e−007
A8 = 2.20262e−011
Eighteenth surface K = −6.19472e+001 A4 = 4.00026e−005 A6 = −5.05699e−008

Various data
Zoom ratio 29.70

| | Wide angle | Intermediate | Telephoto |
|---|---|---|---|
| Focal length | 3.94 | 25.79 | 117.14 |
| F-number | 1.85 | 2.67 | 3.30 |
| Half angle of field (degree) | 36.9 | 6.09 | 1.34 |
| Image height | 2.75 | 2.75 | 2.75 |
| Total lens length | 109.35 | 109.35 | 109.35 |
| BF | 11.36 | 17.58 | 9.24 |
| T1 | 22.95 | 158.31 | 438.51 |
| d7 | 0.71 | 28.85 | 38.22 |
| d15 | 39.18 | 11.04 | 1.66 |
| d16 | 8.86 | 5.15 | 3.09 |
| d27 | 4.33 | 1.82 | 12.23 |
| d30 | 9.03 | 15.26 | 6.91 |

Zoom lens unit data

| Unit | First surface | Focal length |
|---|---|---|
| 1 | 1 | 52.67 |
| 2 | 8 | −8.39 |
| 3 | 16 | ∞ |
| 4 | 17 | 27.37 |
| 5 | 28 | 23.75 |
| 6 | 31 | ∞ | f3a = 43.592
f3b = 36.714
f3fp = 13.801

The relationship between the above-mentioned respective conditional expressions and various numerical values in Numerical Examples is shown in Table 1. In Table 1, the upper row of the conditional expression (7) is a specific gravity of the lens on the object side of the second lens subunit, and the lower row is a specific gravity of the lens on the image side of the second lens subunit.

TABLE 1

| Conditional | Numerical Examples | | | | |
|---|---|---|---|---|---|
| Expressions | 1 | 2 | 3 | 4 | 5 |
| (1) | −2.715 | −2.599 | −2.388 | −2.711 | −3.262 |
| (2) | 1.252 | 1.372 | 1.372 | 1.144 | 1.341 |
| (3) | −1.980 | −2.378 | −2.636 | −4.673 | −4.571 |
| (4) | 2.186 | 1.912 | 1.747 | 2.181 | 2.660 |
| (5) | 3.906 | 7.657 | 11.723 | 4.230 | 4.450 |
| (6) | 0.770 | 0.976 | 1.015 | 0.860 | 0.842 |
| (7) | 2.46 | 2.46 | 2.39 | 3.68 | 3.62 |
| (7) | 4.32 | 3.11 | 3.24 | 4.00 | 3.70 |
| (8) | 1.65 | 2.11 | 2.58 | 1.64 | 1.56 |
| (9) | 1.57 | 2.48 | 2.61 | 2.01 | 1.47 |
| (10) | 0.955 | 0.860 | 0.857 | 0.842 | 1.055 |
| (11) | 3.387 | 2.482 | 2.398 | 3.227 | 6.666 |

Next, a video camera according to an embodiment of the present invention in which the zoom lens according to any one of Examples described above is used as a photographing optical system is described with reference to FIG. 11. In FIG. 11, the video camera includes a video camera main body 10 and a photographing optical system 11 including the zoom lens of the present invention. A solid-state image pickup element (photo-electric conversion element) 12 such as a CCD sensor or a CMOS sensor receives light of a subject image formed by the photographing optical system 11.

A memory 13 records information corresponding to the subject image photoelectrically converted by the solid-state image pickup element 12. A finder 14 is used for observing the subject image displayed on a display element (not shown). The zoom lens of the present invention is applied to an image pickup apparatus such as the video camera, to thereby realize a small image pickup apparatus having high optical characteristic. Note that, the zoom lens of the present invention may be applied to a digital still camera similarly. Note that, in the image pickup apparatus according to the present invention, when an electronic image pickup element such as a CCD is used as the image pickup element, the aberrations may be electronically corrected to further increase quality of an output image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-168329, filed Aug. 21, 2014, which is hereby incorporated by reference herein in its entirety.

What is claimed is:
1. A zoom lens, comprising, in order from an object side to an image side:
a first lens unit having a positive refractive power;
a second lens unit having a negative refractive power;
a third lens unit having a positive refractive power; and
a fourth lens unit having a positive refractive power,
wherein, during zooming, the first lens unit is configured not to move, and the second lens unit, the third lens unit, and the fourth lens unit are configured to move, wherein the third lens unit comprises, in order from the object side to the image side, a first lens subunit and a second lens subunit each having a positive refractive power, the second lens subunit is configured to move in a direction having a component of a direction perpendicular to an optical axis during image blur correction, the first lens subunit comprises at least one positive lens and at least one negative lens, and the second lens subunit comprises a positive lens and a negative lens, and wherein the following conditional expressions are satisfied:

$$-3.9<f3/f2<-2.2,$$

$$0.9<f3b/f3<1.6, \text{ and}$$

$$0.7<f3b/f3a<1.1,$$

where f2 represents a focal length of the second lens unit, f3 represents a focal length of the third lens unit, f3a represents a focal length of the first lens subunit, and f3b represents a focal length of the second lens subunit.

2. A zoom lens according to claim 1, wherein the following conditional expression is satisfied:

$$-5.1<z \times m3/m2<-1.8$$

where z represents a zoom ratio of the zoom lens, m2 represents a movement amount of the second lens unit during zooming from a wide angle end to a telephoto end, and m3 represents a movement amount of the third lens unit during the zooming from the wide angle end to the telephoto end, provided that the movement amount is a difference between positions on the optical axis of each of the second lens unit and the third lens unit at the wide angle end and the telephoto end, and a sign of the movement amount is positive in a case of being positioned further on the image side at the telephoto end than at the wide angle end.

3. A zoom lens according to claim 1, wherein the following conditional expression is satisfied:

$$1.5<f3b/f3fp<2.9$$

where f3fp represents a focal length of a positive lens that is arranged closest to the object side of the at least one positive lens of the first lens subunit.

4. A zoom lens according to claim 1, wherein the following conditional expression is satisfied:

$$3.0<D3/D4<14.0$$

where D3 represents a distance on the optical axis from a lens surface that is closest to the object side to a lens surface that is closest to the image side of the third lens unit, and D4 represents a distance on the optical axis from a lens surface that is closest to the object side to a lens surface that is closest to the image side of the fourth lens unit.

5. A zoom lens according to claim 1, further comprising an aperture stop arranged between the second lens unit and the third lens unit,
wherein the aperture stop is configured not to move during zooming.

6. A zoom lens according to claim 1, wherein all lens materials contained in the second lens subunit are materials that satisfy the following conditional expression:

$$s3b<4.5$$

where s3b is a specific gravity of a material of each lens forming the second lens subunit.

7. A zoom lens according to claim 1, wherein the following conditional expression is satisfied:

$$1.3<v3apav/v3anav<4.0$$

where v3apav represents an average value of Abbe numbers of materials of positive lenses included in the first lens subunit, and v3anav represents an average value of Abbe numbers of materials of negative lenses included in the first lens subunit.

8. A zoom lens according to claim 1, wherein the following conditional expression is satisfied:

$$1.3<v3bp/v3bn<4.0$$

where v3bp represents an Abbe number of a material of the positive lens included in the second lens subunit, and v3bn represents an Abbe number of a material of the negative lens included in the second lens subunit.

9. An image pickup apparatus, comprising:
a zoom lens according to claim 1; and
an image pickup element configured to receive an image formed by the zoom lens.

10. An image pickup apparatus according to claim 9, wherein the following conditional expression is satisfied:

$$2.1<f3b/2Y<7.5$$

where 2Y represents a diagonal length of a use range of the image pickup element.

11. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein, during zooming, the first lens unit is configured not to move, and the second lens unit, the third lens unit, and the fourth lens unit are configured to move,
wherein the third lens unit comprises, in order from the object side to the image side, a first lens subunit and a second lens subunit each having a positive refractive power, the second lens subunit is configured to move in a direction having a component of a direction perpendicular to an optical axis during image blur correction, the first lens subunit-comprises at least one positive lens and at least one negative lens, and the second lens subunit comprises a positive lens and a negative lens; and wherein the following conditional expressions are satisfied:

$$-3.9<f3/f2<-2.2,$$

$$0.9<f3b/f3<1.6, \text{ and}$$

$$0.7<(T1m/fm)/(T1w/fw)<1.2,$$

where f2 represents a focal length of the second lens unit, f3 represents a focal length of the third lens unit, and f3b represents a focal length of the second lens subunit, fw represents a focal length of the zoom lens at a wide angle end, T1w represents an entrance pupil position at the wide angle end, fm represents a focal length of the zoom lens at an intermediate zoom position, and T1m represents an entrance pupil position at the intermediate zoom position.

12. A zoom lens, comprising, in order from an object side to an image side:
a first lens unit having a positive refractive power;
a second lens unit having a negative refractive power;

a third lens unit having a positive refractive power and comprising, in order from the object side to the image side:
   a first lens subunit and a second lens subunit each having a positive refractive power, the second lens subunit being configured to move in a direction having a component of a direction perpendicular to an optical axis during image blur correction, the third lens unit comprising at least two positive lenses and at least two negative lenses, and the second lens subunit comprising a positive lens and a negative lens;
a fourth lens unit having a positive refractive power; and
an aperture stop arranged between the second lens unit and the third lens unit,
wherein, during zooming, the first lens unit and the aperture stop being configured not to move and, the second lens unit, the third lens unit, and the fourth lens unit are configured to move,
wherein the following conditional expressions are satisfied:

$-3.9 < f3/f2 < -2.2$ $0.9 < f3b/f3 < 1.6$ where f2 represents a focal length of the second lens unit, f3 represents a focal length of the third lens unit, and f3*b* represents a focal length of the second lens subunit.

* * * * *